United States Patent [19]
Morrison et al.

[11] 3,939,418
[45] Feb. 17, 1976

[54] WALKIE-TALKIE DEVICE

[75] Inventors: Howard J. Morrison, Deerfield; Albert G. Keller, Chicago, both of Ill.

[73] Assignee: Marvin Glass & Associates, Chicago, Ill.

[22] Filed: Oct. 7, 1974

[21] Appl. No.: 512,553

[52] U.S. Cl. ................................. 325/16; 325/21
[51] Int. Cl.² ........................................ H04B 1/38
[58] Field of Search .................... 325/16, 18–20, 325/21, 22

[56] References Cited
UNITED STATES PATENTS
3,315,263  4/1967  Lefevre .............................. 325/16

Primary Examiner—Albert J. Mayer
Attorney, Agent, or Firm—Coffee & Sweeney

[57] ABSTRACT

A walkie-talkie unit having a speaker connected to a radio transceiver for normal transmitting and receiving functions, plus a selectively actuatable audio signal generator. The generator generates one of a plurality of distinct signals of different frequency in response to a hand manipulatable actuator. When the walkie-talkie is in a transmitting mode the signal is transmitted to another walkie-talkie. When the walkie-talkie is in a receiving mode the signal is amplified by the generating walkie-talkie.

14 Claims, 5 Drawing Figures

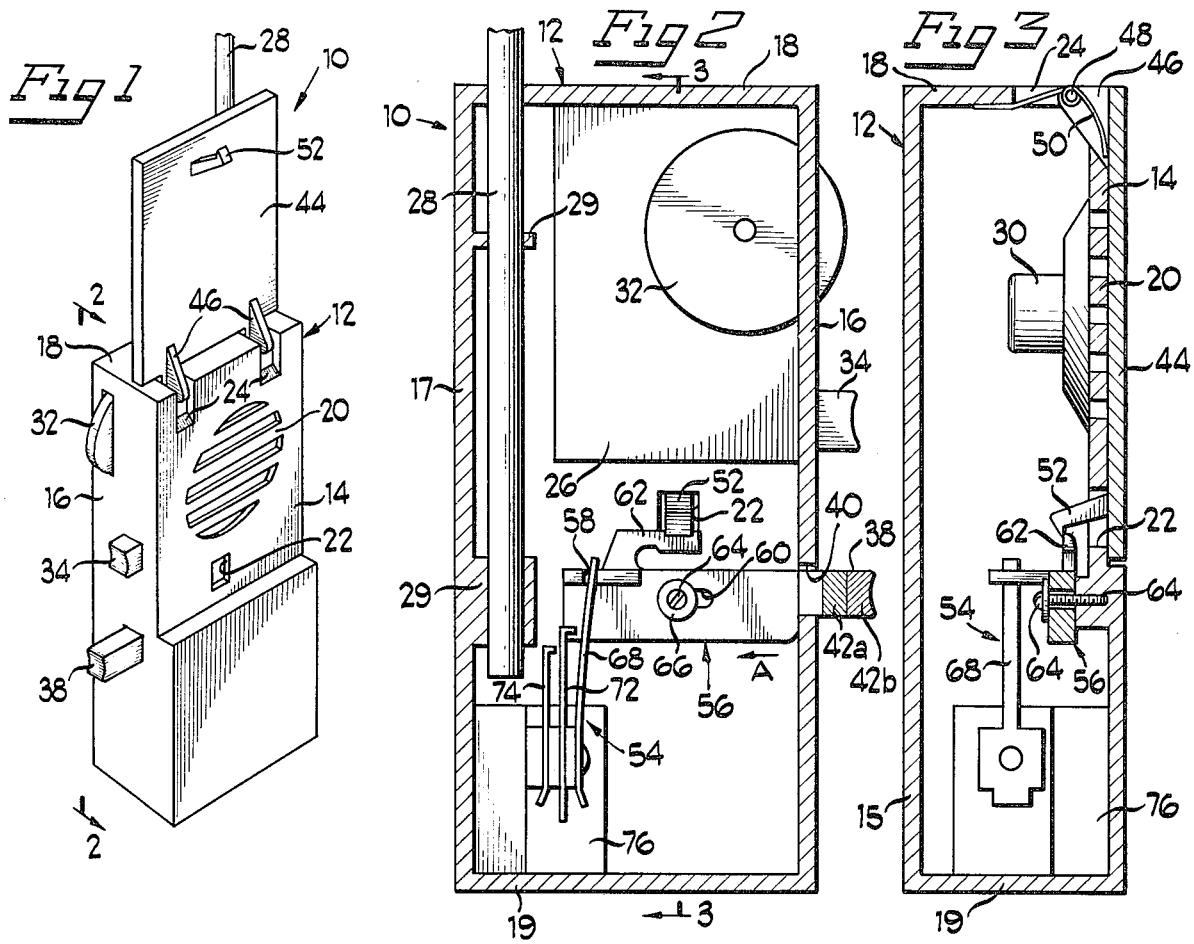
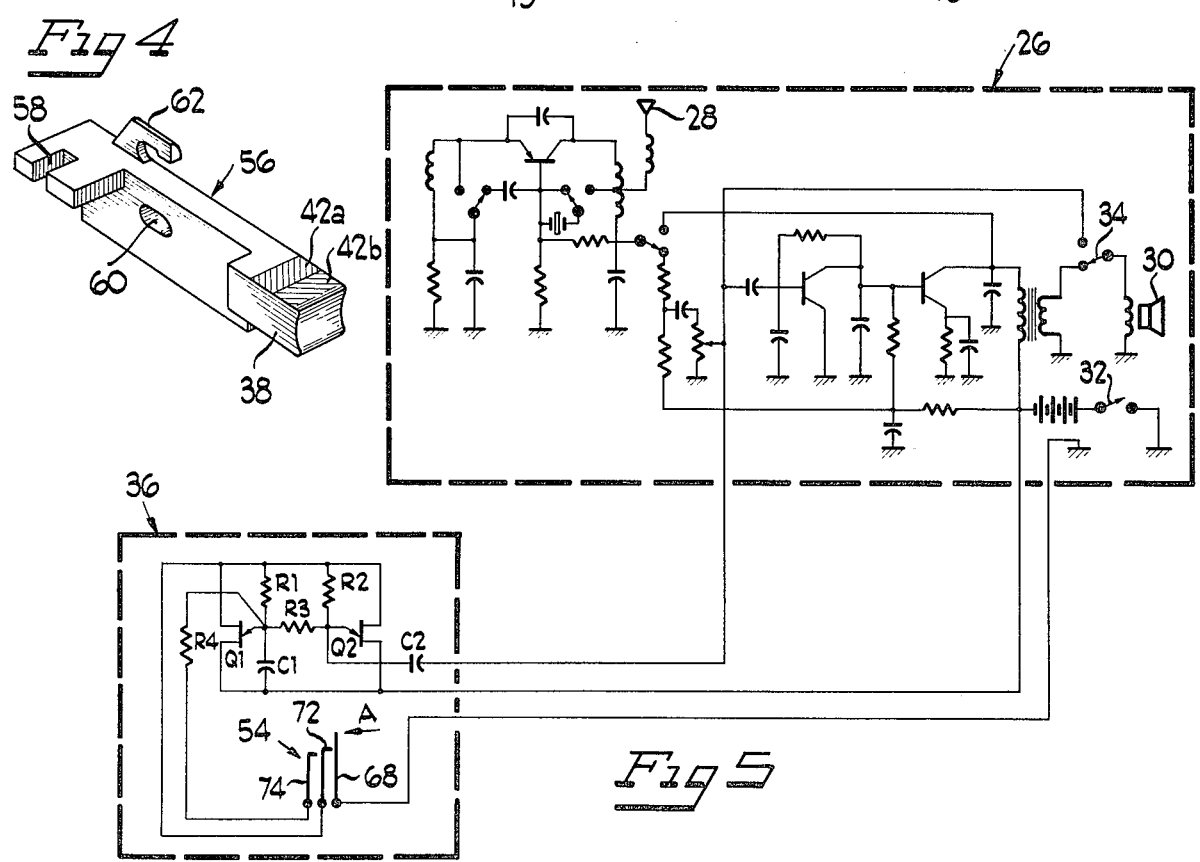

WALKIE-TALKIE DEVICE

BACKGROUND AND SUMMARY OF THE INVENTION

This invention relates generally to transceivers and particularly to signal generators to be used in association with transceivers.

Walkie-talkies or transceivers are known in the art. Ordinarily, a walkie-talkie includes a speaker connected to a radio transceiver. The transceiver is changeable from a transmitting mode to a receiving mode and vice versa.

Walkie-talkies have enjoyed increasing popularity as amusement devices for children where the children simulate different play situations employing a plurality of walkie-talkies.

It is a principal object of the present invention to provide a walkie-talkie unit having sound and action associated therewith in order to make it more appealing to children.

One form of the invention currently contemplated provides a walkie-talkie unit which includes a speaker connected to a radio transceiver for normal transmitting and receiving functions. A selectively actuatable signal generator also is connected to the transceiver for generating an audio signal of at least one frequency. The walkie-talkie transmits the signal to another walkie-talkie when in a transmitting mode and generates sound from its own speaker when in a receiving mode. A hand manipulatable actuator is provided to selectively actuate the signal generator.

Other objects, features and advantages of the invention will be apparent from the following detailed description taken in connection with the accompanying drawings.

BRIEF DESCRIPTION OF THE DRAWINGS

FIG. 1 is a perspective view of the walkie-talkie unit of the present invention;

FIG. 2 is a sectional view, on an enlarged scale, taken generally along the line 2—2 of FIG. 1;

FIG. 3 is a sectional view taken generally along the line 3—3 of FIG. 2;

FIG. 4 is an enlarged perspective view of a portion of the signal actuator used in the walkie-talkie unit of the present invention; and FIG. 5 is a schematic electrical diagram of the circuitry of the walkie-talkie unit of the present invention.

DESCRIPTION OF THE PREFERRED EMBODIMENT

Turning now to FIGS. 1–3 in greater detail, the walkie-talkie unit, generally designated 10, of the present invention is shown to include a housing, generally designated 12, made of plastic or other suitable material. The housing 12 includes a front wall 14, a back wall 15, a side wall 16, an opposite side wall 17, a top wall 18, and a bottom wall 19. The front wall 14 has a speaker grill 20 formed therein along with a square opening 22 and two upper hinge receiving recesses 24 (FIGS. 1 and 3).

The walkie-talkie unit 10 contains a transceiver 26 (FIG. 5) which includes an antenna 28 mounted along the inside of side wall 17 in mounting bosses 29 (FIG. 2), and a microphone/speaker 30 (FIG. 3) mounted along the inside of front wall 14 in back of the speaker grill 20. The transceiver 26 also includes an on-off volume dial 32 (FIG. 2) extending partially outside of side wall 16 and a transmit-receive button 34 also extending outside of side wall 16.

The transceiver 26 of the walkie-talkie of the present invention works in the normal conventional manner. The transceiver is actuated when dial 32 is rotated to an on position. When the transmit-receive button 34 is in a normal position, the transceiver is in a receiving mode. When an operator depresses button 34 toward side wall 16, the transceiver is changed into a transmitting mode whereby sound directed into microphone/speaker 30 is transmitted to another walkie-talkie unit.

However, unlike conventional walkie-talkie units, the one of the present invention also includes an electrical signal generator, generally designated 36 (FIG. 5), which is incorporated into transceiver 26. The signal generator generates one of a plurality of distinct signals of different frequency so that the walkie-talkie unit transmits a signal to another walkie-talkie unit when in a transmitting mode, or generates sound from the speaker 30 of the same unit when in a receiving mode.

The signal generator 36 has a hand manipulatable signal actuator associated therewith including a finger engaging button 38 extending through an opening 40 in the side wall 16. The finger engaging button 38 has two distinguishable portions 42a and 42b, for instance different colors. A "first frequency position" is defined when the button 38 is depressed inwardly toward side wall 16 an amount to cover only the portion of 42a and a first frequency is emitted from the signal generator 36. A "second frequency position" is attained upon further depression of button 38, resulting in a second, higher frequency being emitted.

The walkie-talkie unit 10 has a snap open cover 44 mounted to normally cover the speaker grill 20 of the front wall 14. The cover 44 is associated with the signal actuator so that movement of the button 38 to the second frequency position will cause the cover 44 to snap open.

More particularly, looking at FIGS. 1 and 3, the cover 44 is seen to include two hinges 46 at the top thereof which are rotatably mounted on a pair of shafts 48 formed in the recesses 24. A leaf spring 50 is wound around each shaft 48 so that the cover 44 is biased in an open position. The cover 44 has a hook 52 formed near the free end thereof which is receivable through the opening 22 in the front wall 14 to engage a portion of the signal actuator, as will be described in greater detail hereinafter. Pressing the button 38 inwardly causes disengagement of the hook 52 thereby allowing springs 50 to snap the cover 44 to its open position (FIG. 1).

The signal actuator generally includes switch means, generally designated 54, and a horizontal reciprocally mounted member, generally designated 56 (see FIGS. 2 and 4). Looking at FIG. 4, the horizontal member 56 has a contact receiving slot 58, a guide slot 60, an upstanding cover holding portion 62 and the finger engaging button 38 which extends outside of the housing 12. The horizontal member 56 is reciprocally mounted to the interior of the front wall 14 by means of a fastener 64 having a washer 66 at the head thereof being received through guide slot 6 and secured to the front wall 14.

When in the position shown in FIGS. 2 and 3, the upstanding cover holding portion 62 engages the cover hook 52 thereby holding the cover 44 in its closed position (FIG. 3). Whenever the horizontal member 56 is moved inwardly in the direction indicated by arrow A in FIG. 2 by depressing the button 38 to the second frequency, cover holding portion 62 will move out of engagement with cover hook 52 to allow the cover 44 to flip open as described above.

The switch means 54 generally comprises a common contact 68, a first frequency contact 72 and a second frequency contact 74. All three contacts 68, 72 and 74 are vertically orientated and are normally spaced apart, generally parallel with respect to each other, and mounted in a mounting block 76 secured between the front wall 14, the side wall 17 and the bottom wall 19 (see FIGS. 2 and 3). The common contact 68 is longer than contacts 72 and 74 and extends upwardly to be received within the contact receiving slot 58 formed in the horizontal member 56. All three contacts 68, 72 and 74 are relatively flexible so that when the horizontal member 56 is moved in the direction indicated by arrow A in FIG. 2, common contact 68 will move into touching relationship with the first frequency contact 72 and, upon further movement, all three contacts will become in touching relationship with each other.

When the button 38 is depressed to its first frequency position, the common contact 68 and the first frequency contact 72 touch each other and a low frequency signal is generated. When button 38 is moved to its second frequency position, all three contacts 68, 72 and 74 touch each other and a higher frequency signal is generated.

Turning now to FIG. 5 in greater detail, the electrical circuit comprising the transceiver 26 is shown schematically. The transceiver portion 26 is a common, well known commercially available three transistor walkie-talkie circuit. The transceiver circuit is shown only to illustrate the typical connection points for the signal generator 36 which is electrically connected to the transceiver 26, as well as the antenna 28, microphone/speaker 30, on-off volume dial 32 and transmit-receiver button 34.

The signal generator 36 is a dual frequency oscillator comprising two unijunction transistors Q1 and Q2, along with four resistors R1-R4. The switch means 54 serves to selectively connect the combination of transistors Q1 and Q2 to the transceiver 26 with or without resistor R4 in circuit. Transistor Q1 is of a lower frequency than transistor Q2. When both are functional together, one modulates the other and a "warbling" signal is created.

Whenever the switch means 54 is such that all three contacts 68, 72 and 74 are in their normal spaced apart relationship as shown in FIGS. 2 and 5, no signal is fed into the transceiver 26. Thus, an operator can use the walkie-talkie unit 10 just as any customary walkie-talkie unit to transmit or receive. However, when the switch means 54 is activated so that contact 68 touches contact 72, the combined modulated signal generated by both transistors Q1 and Q2 is added to the transceiver circuit so that that signal is either transmitted to another walkie-talkie or fed through the speaker 30 of the generating unit depending on whether the transmit-receive button 34 is in a transmit mode or a receive mode, respectively. Additionally, if the switch means 54 is such that all three contacts 68, 72 and 74 are in touching relationship with one another simultaneously, both transistors Q1 and Q2 as well as resistor R4 will be connected to the transceiver circuit so that a different higher "warbling" frequency will be either transmitted or amplified as the case may be. This is effected by adding resistor R4 in circuit in parallel with resistor R1.

Resistor R4 has a lesser resistance than resistor R1 and thus raises the frequency.

In use, the walkie-talkie unit 10 of the present invention has special interest to children. For example, the first signal can represent a "warning" signal whereas the second signal represents a "communicate" signal. To alert another operator of the intention to transmit a message he would depress the button 38 to its second frequency position causing the high frequency "communicate" signal to be generated while the transceiver is in a transmitting mode. Simultaneously with the transmission of the "communicate" signal, the cover 44 would flip open preparatory to receiving a response or sending a message. Depression of button 38 to its first frequency position will cause the transmittal or amplification of the warning signal. As a result, the pleasure of playing with walkie-talkie units will be enhanced especially in simulated action situations.

The foregoing detailed description has been given for clearness of understanding only and no unnecessary limitations should be understood therefrom as some modifications will be obvious to those skilled in the art.

We claim:

1. In a walkie-talkie unit including a microphone/speaker connected to a radio transceiver including an RF source, a power supply, a modulator, an audio amplifier, an antenna, a detector for transmitting and receiving audio signals and switch means for selectively operating in either a transmit or receive mode, the improvement comprising:

a selectively actuatable audio signal generator connected to said transceiver for generating an audio signal of at least one frequency for transmission to another walkie-talkie when in a transmitting mode as well as generating sound from its speaker when in a receiving mode; and a hand manipulatable actuator to selectively actuate said signal generator in either of said modes.

2. The walkie-talkie unit of claim 1 wherein said signal generator comprises at least one electronic oscillator.

3. The walkie-talkie unit of claim 1 wherein said walkie-talkie includes a housing with a cover member pivotally mounted on said housing over said speaker, said cover member being movable from a normally shut position to an open position in response to the manipulation of the actuator.

4. The walkie-talkie unit of claim 2 wherein the electronic oscillator is a relaxation oscillator including at least one capacitor and one resistor connected to the power supply and at least one transistor to cyclically discharge the capacitor to produce the audio frequency signal.

5. The walkie-talkie unit of claim 11 wherein said oscillator includes at least one unijunction transistor.

6. The walkie-talkie unit of claim 2 wherein said signal generator comprises a pair of electronic oscillators connected in parallel across the power source to interact with one another when actuated to generate a warbling audio frequency signal.

7. In a walkie-talkie unit including a microphone/speaker connected to a radio transceiver including an RF source, a power supply, a modulator, an audio amplifier, an antenna, a detector for transmitting and receiving audio signals and switch means for selectively operating in either a transmit or receive mode, the improvement comprising:

a selectively actuatable signal generator connected to said transceiver for generating one of a plurality of distinct signals of different frequency for transmitting a signal of one frequency to another walkie-talkie when in a transmitting mode and generating a signal of another frequency from the speaker when in a receiving mode; and a hand manipulatable actuator to selectively actuate said signal generator for generating one of the frequencies.

8. The walkie-talkie unit of claim 7 wherein said signal generator is a multifrequency electronic oscillator.

9. The walkie-talkie unit of claim 7 wherein said walkie-talkie includes a housing with a cover pivotally mounted over said speaker, said cover being movable from a normally shut position to an open position in response to manipulation of the actuator.

10. The walkie-talkie unit of claim 6 wherein the electronic oscillator is a relaxation oscillator including at least two capacitors and two resistors connected to the power supply and at least two transistors to cyclically discharge the capacitors to produce the audio frequency signal.

11. The walkie-talkie unit of claim 10 wherein said oscillator includes a plurality of unijunction transistors.

12. The walkie-talkie unit of claim 10 wherein said actuator includes switch means connected to said oscillator and a resistor for selectively producing a signal of a different frequency.

13. The walkie-talkie unit of claim 12 wherein said oscillator includes a pair of resistors of different values connected in parallel to one of said transistors, and said switch means is connected to said transistors and resistors for selectively adding one of the parallel resistors to the circuit to vary the frequency of said one transistor.

14. The walkie-talkie unit of claim 8 wherein said signal generator comprises a pair of electronic oscillators connected in parallel across the power source to interact with one another when actuated to generate a warbling audio frequency signal.

* * * * *